(12) United States Patent
Mallette

(10) Patent No.: US 11,648,972 B2
(45) Date of Patent: May 16, 2023

(54) MOTORIZED SCOOTER CART SYSTEM

(71) Applicant: Kermit Mallette, Pensacola, FL (US)

(72) Inventor: Kermit Mallette, Pensacola, FL (US)

( * ) Notice: Subject to any disclaimer, the term of this patent is extended or adjusted under 35 U.S.C. 154(b) by 140 days.

(21) Appl. No.: 17/176,094

(22) Filed: Feb. 15, 2021

(65) Prior Publication Data
US 2021/0253153 A1    Aug. 19, 2021

Related U.S. Application Data

(60) Provisional application No. 62/975,950, filed on Feb. 13, 2020.

(51) Int. Cl.
*B62B 5/00* (2006.01)
*B62K 11/10* (2006.01)

(52) U.S. Cl.
CPC .......... *B62B 5/0079* (2013.01); *B62B 5/0033* (2013.01); *B62K 11/10* (2013.01)

(58) Field of Classification Search
CPC ... B62B 5/0033; B62B 5/0036; B62B 5/0069; B62B 5/0079; B62B 5/06; B62B 5/085; B62B 5/087; B62K 7/00; B62K 7/02; B62K 7/04; B62K 11/10; B62K 13/00; B62K 27/00; B62K 27/02
See application file for complete search history.

(56) References Cited

U.S. PATENT DOCUMENTS

| 2,410,280 | A | * | 10/1946 | Fergason | B60D 1/025 280/514 |
| 3,485,314 | A | * | 12/1969 | Herr | B60P 9/00 280/415.1 |
| 3,575,250 | A |   | 4/1971  | Dykes | |
| 3,834,726 | A | * | 9/1974  | Hobza | B62B 5/0026 280/481 |
| 4,096,920 | A | * | 6/1978  | Heyn | B62D 51/02 280/DIG. 4 |
| 4,771,840 | A |   | 9/1988  | Keller | |
| 6,443,252 | B1 | * | 9/2002 | Andes | A61G 5/1089 280/32.7 |
| 6,575,819 | B2 | * | 6/2003 | Beyersdorff | B24B 7/188 451/352 |
| 7,300,061 | B1 | * | 11/2007 | Omstead | B62D 63/06 280/400 |
| 7,591,509 | B2 |   | 9/2009 | Almy | |

(Continued)

*Primary Examiner* — Kevin Hurley
*Assistant Examiner* — Maurice L Williams

(57) ABSTRACT

A motorized scooter cart system is a system that enables a user to comfortably move around while transporting objects or people. The system may include a scooter deck, at least one scooter wheel, a linkage arm, at least one seat assembly, a handlebar assembly, and a pushcart. The scooter deck is designed to support the weight of the user so that the user can freely maneuver the pushcart. The at least one scooter wheel provides the translational force necessary to move the present invention. The linkage arm enables the coupling of the scooter deck to the pushcart. The linkage arm also facilitates the maneuvering of the pushcart. The at least one seat assembly enables the user to comfortably seat while maneuvering the pushcart. The pushcart enables the transportation of objects or people mounted onto the pushcart. Finally, the handlebar assembly enables the control of the pushcart by the user.

16 Claims, 7 Drawing Sheets

(56) References Cited

U.S. PATENT DOCUMENTS

| | | | |
|---|---|---|---|
| 7,699,128 B1* | 4/2010 | Strauss | B62B 5/0026 180/23 |
| 7,735,587 B1* | 6/2010 | Stahlnecker | B62B 1/12 280/47.131 |
| 7,789,187 B2* | 9/2010 | Zerhusen | B62D 51/04 180/323 |
| 8,165,718 B2* | 4/2012 | Ota | B66F 9/063 700/250 |
| 8,365,850 B2* | 2/2013 | Gal | B62K 3/002 180/209 |
| 8,371,404 B2* | 2/2013 | Boeckler | E04H 4/14 180/65.1 |
| 8,573,338 B2* | 11/2013 | Gal | B62B 5/0026 180/209 |
| 9,272,589 B2* | 3/2016 | Yamano | B62K 11/007 |
| 9,333,979 B2* | 5/2016 | Pinchas | B62B 5/0033 |
| 9,365,254 B1* | 6/2016 | Durrett | B62K 27/12 |
| 9,643,639 B1* | 5/2017 | Rene | B62B 5/02 |
| 9,669,857 B1 | 6/2017 | Rainey | |
| 10,137,921 B2* | 11/2018 | Lee | B62B 5/004 |
| 10,351,201 B1 | 7/2019 | Wright | |
| 10,603,236 B2* | 3/2020 | Kottmann | B62B 3/10 |
| 10,751,232 B1* | 8/2020 | Ilao | A61G 5/1051 |
| 10,906,573 B2* | 2/2021 | Chung | B62B 5/0073 |
| 11,000,432 B2* | 5/2021 | Katsura | B62B 5/087 |
| 11,021,181 B2* | 6/2021 | Huizinga | B62B 1/12 |
| 11,414,119 B1* | 8/2022 | Morgan | B62J 1/08 |
| 2010/0032927 A1* | 2/2010 | Gordon | A47B 3/10 280/659 |
| 2014/0251072 A1* | 9/2014 | LaBrie | B62B 17/061 74/551.9 |
| 2014/0265254 A1* | 9/2014 | Sekine | B60L 1/003 280/638 |
| 2015/0066274 A1* | 3/2015 | Hijikata | B62B 5/0073 180/19.1 |
| 2017/0129522 A1* | 5/2017 | Lee | B60K 1/04 |
| 2017/0203778 A1* | 7/2017 | Jackson | B62B 5/0036 |
| 2018/0001918 A1* | 1/2018 | Collibault | B62B 5/0033 |
| 2018/0236932 A1* | 8/2018 | Leslie | B62B 9/005 |
| 2020/0156501 A1* | 5/2020 | Irwin | B60L 58/14 |

* cited by examiner

MOTORIZED SCOOTER CART SYSTEM

The current application claims a priority to the U.S. Provisional Patent application Ser. No. 62/975,950 filed on Feb. 13, 2020. The current application is filed on Feb. 15, 2021 while Feb. 13, 2020 was on a weekend.

FIELD OF THE INVENTION

The present invention relates generally to personal mobility devices. More specifically, the present invention is a personal motorized scooter cart system that can be integrated into different transport devices such as shopping carts, medical gurneys, or hospital beds, to enable the driver to get around for extended periods of time.

BACKGROUND OF THE INVENTION

Shopping carts are available in almost every supermarket, department store, or bulk item superstore for use by customers for transport of merchandise to the checkout counter during shopping. Most shopping carts are designed to be moved by pushing on a handlebar provided at the rear of the shopping cart, a task that many users can perform without much difficulty if the load on the cart is not too heavy. However, many users such as the elderly and people with special needs can find it difficult to push and maneuver a cart even under reasonable loads. Many efforts have been made over several years to motorize such shopping carts to reduce the amount of force that a user normally needs to exert to move a shopping cart forward, thereby making the shopping cart more comfortable to use. However, existing motorized shopping carts still suffer from drawbacks in that it is very expensive to manufacture such shopping carts and retrofitting existing shopping carts is usually time-consuming and cumbersome. Moreover, motorizing shopping carts usually requires specifically designed components that are not readily available. The present invention aims to solve some of these problems by disclosing a motorized scooter cart system.

An objective of the present invention is to provide a motorized scooter cart system that can be configured into a shopping cart or similar transport device to facilitate the movement of the user while mobilizing multiple items placed on the cart. Another objective of the present invention is to provide a motorized scooter cart system that is easy to operate and can be stored away when the transport device is not in use. Furthermore, another objective of the present invention is to provide a motorized scooter cart system that can be configured into transport devices such as medical gurneys or carriages to help mobilize people along with the user. Additional features and benefits are further discussed in the sections below.

SUMMARY OF THE INVENTION

The present invention provides a motorized scooter cart system designed to facilitate the movement of the user while transporting multiples items or people. The present invention can be configured into a shopping cart, medical gurney, or carriage in a cost-efficient and convenient manner. The present invention simplifies the transportation of these transport devices without requiring major modification of the transport device or complicated installations. The present invention further provides different maneuvering accessories, such as turning lights and a horn, that greatly improve the maneuverability of the present invention in different situations.

DETAILED DESCRIPTION OF THE INVENTION

All illustrations of the drawings are for the purpose of describing selected versions of the present invention and are not intended to limit the scope of the present invention.

Figure 1:
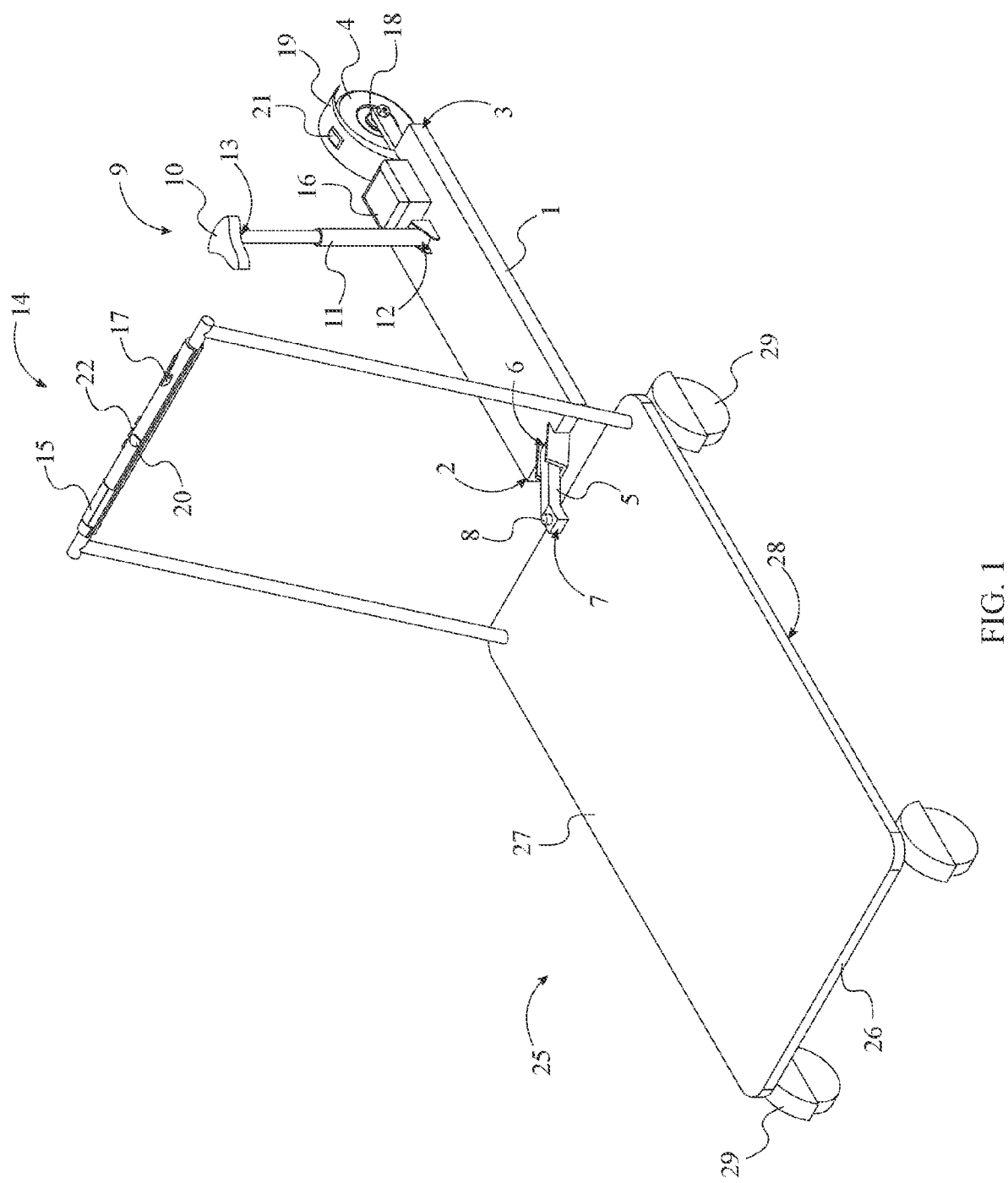
FIG. 1 is a top-front perspective view showing the present invention.
Figure 2:
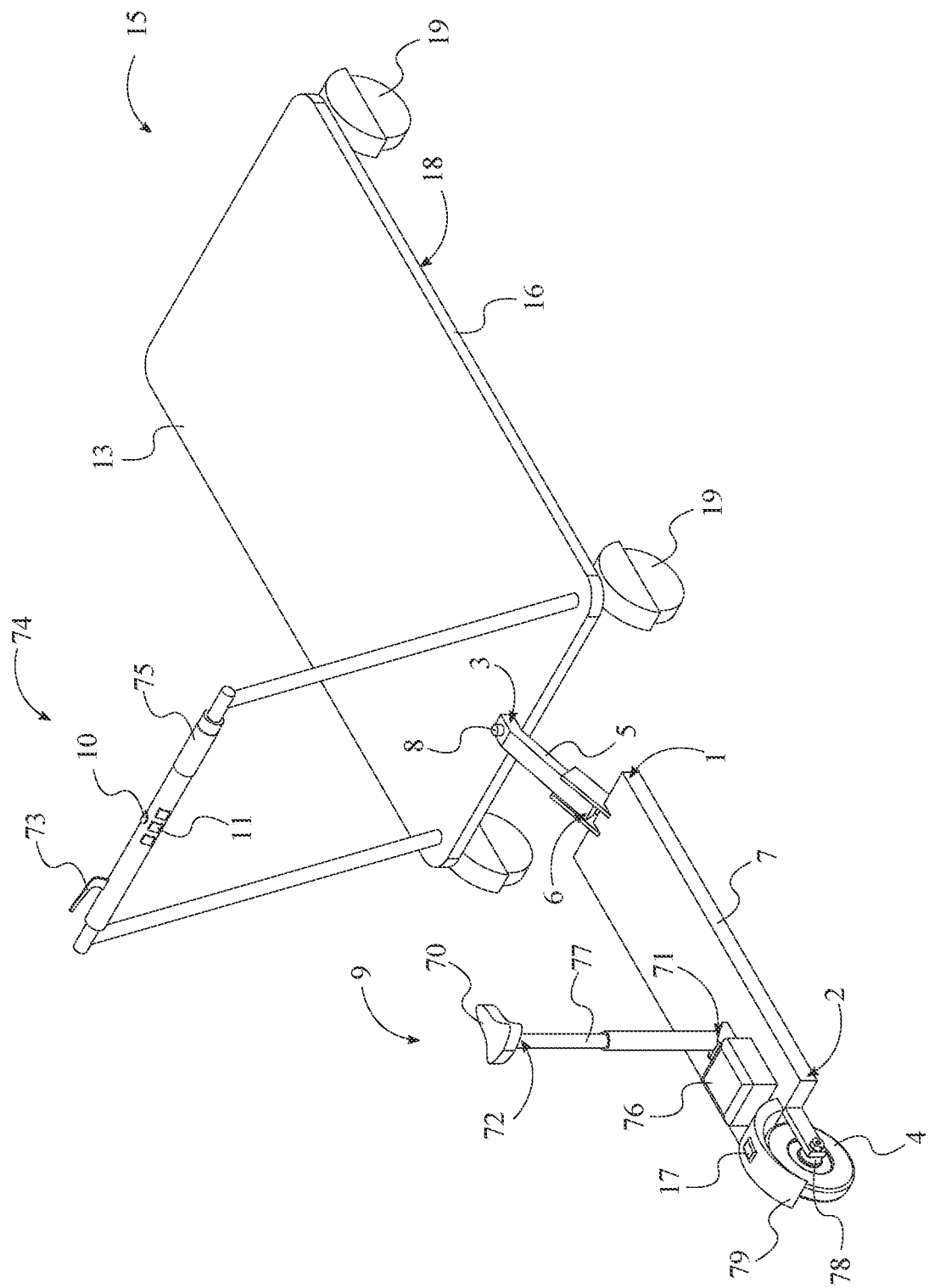
FIG. 2 is a top-rear perspective view showing the present invention.

The present invention is a motorized scooter cart system that enables a user to comfortably move around while transporting objects or people without requiring the user to exert force to transport the objects or the people. As can be seen in FIGS. 1 and 2, the present invention may comprise a scooter deck 1, at least one scooter wheel 4, a linkage arm 5, at least one seat assembly 9, a handlebar assembly 14, and a pushcart 25. The scooter deck 1 is designed to support the weight of the user so that the user can freely maneuver the pushcart 25. The at least one scooter wheel 4 provides the translational force necessary to move the scooter deck 1 and the pushcart 25. The linkage arm 5 enables the coupling of the scooter deck 1 to the pushcart 25. The linkage arm 5 also facilitates the maneuvering of the pushcart 25. The at least one seat assembly 9 enables at least one user to comfortably seat on top of the scooter deck 1 while maneuvering the pushcart 25. The pushcart 25 enables the transportation of objects or other people mounted onto the pushcart 25. Finally, the handlebar assembly 14 enables the control of the pushcart 25 by the user.

The general configuration of the aforementioned components allows users of any capacity to comfortably transport objects or people without exerting great force. As can be seen in FIGS. 1 and 2, the scooter deck 1 is preferably an elongated planar body that is large enough to accommodate the body weight of at least one user. The scooter deck 1 comprises a first deck end 2 and a second deck end 3 due to the elongated structure design. Similarly, the linkage arm 5 is an elongated structure with a tubular design and with a length long enough to sufficiently offset the scooter deck 1 from the pushcart 25. The linkage arm 5 comprises a first arm end 6 and a second arm end 7 due to the tubular shape of the linkage arm 5 as well as a swivel hitch 8 that enables the coupling of the linkage arm 5 to the pushcart 25. The first deck end 2 is positioned opposite to the second deck end 3 across the scooter deck 1 to provide enough space to situate the at least one seat assembly 9 and the feet of the user. Likewise, the first arm end 6 is positioned opposite to the second arm end 7 along the linkage arm 5 to sufficiently offset the scooter deck 1 from the pushcart 25. The swivel hitch 8 is attached onto the second arm end 7 to connect the second arm end 7 to the pushcart 25. For example, the second arm end 7 can be pivotally fastened to the pushcart 25 by the swivel hitch 8 so that the pushcart 25 can be rotated about the second arm end 7. Thus, the swivel hitch 8 enables the maneuvering of the pushcart 25 by letting the user turn the pushcart 25 left or right. In addition, the at least one scooter wheel 4 is rotatably mounted to the second deck end 3 to transform rotational forces to translational forces, thus enabling the movement of the scooter deck 1 and the pushcart 25. The at least one seat assembly 9 is mounted onto the scooter deck 1 to enable the user to comfortably sit while the scooter deck 1 is moving. In addition, the at least one seat assembly 9 is positioned adjacent to the second deck end 3 so that the load of the user bears down on the at least one scooter wheel 4. Furthermore, the handlebar assembly 14 is mounted onto the pushcart 25, adjacent to the linkage arm 5, to control the movement of the scooter deck 1 and the pushcart 25 as well as to provide different maneuvering accessories, such as audio or visual maneuvering accessories.

Figure 3:
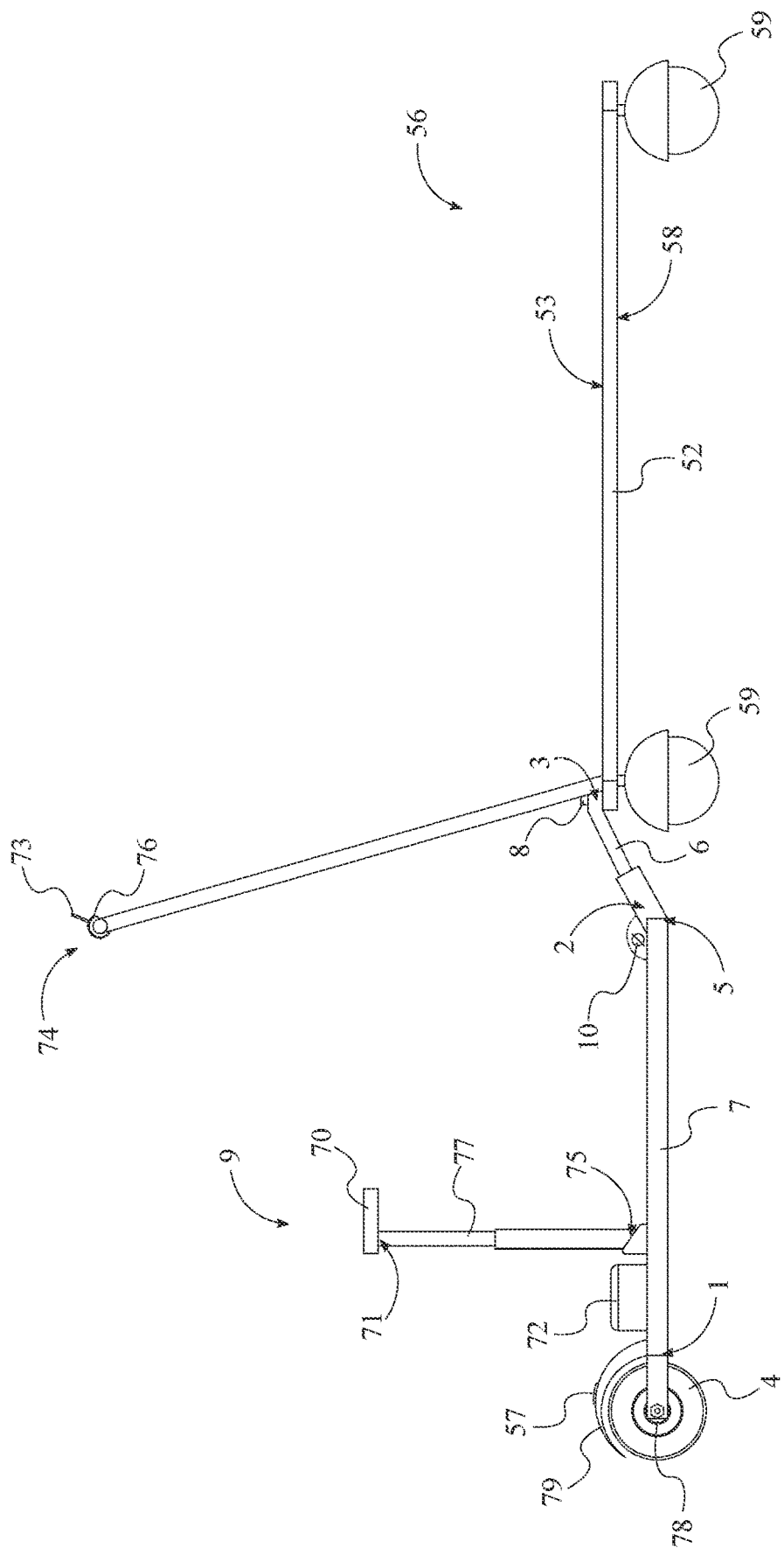
FIG. 3 is a side view showing the present invention, wherein the present invention is shown in a deployed configuration.
Figure 4:
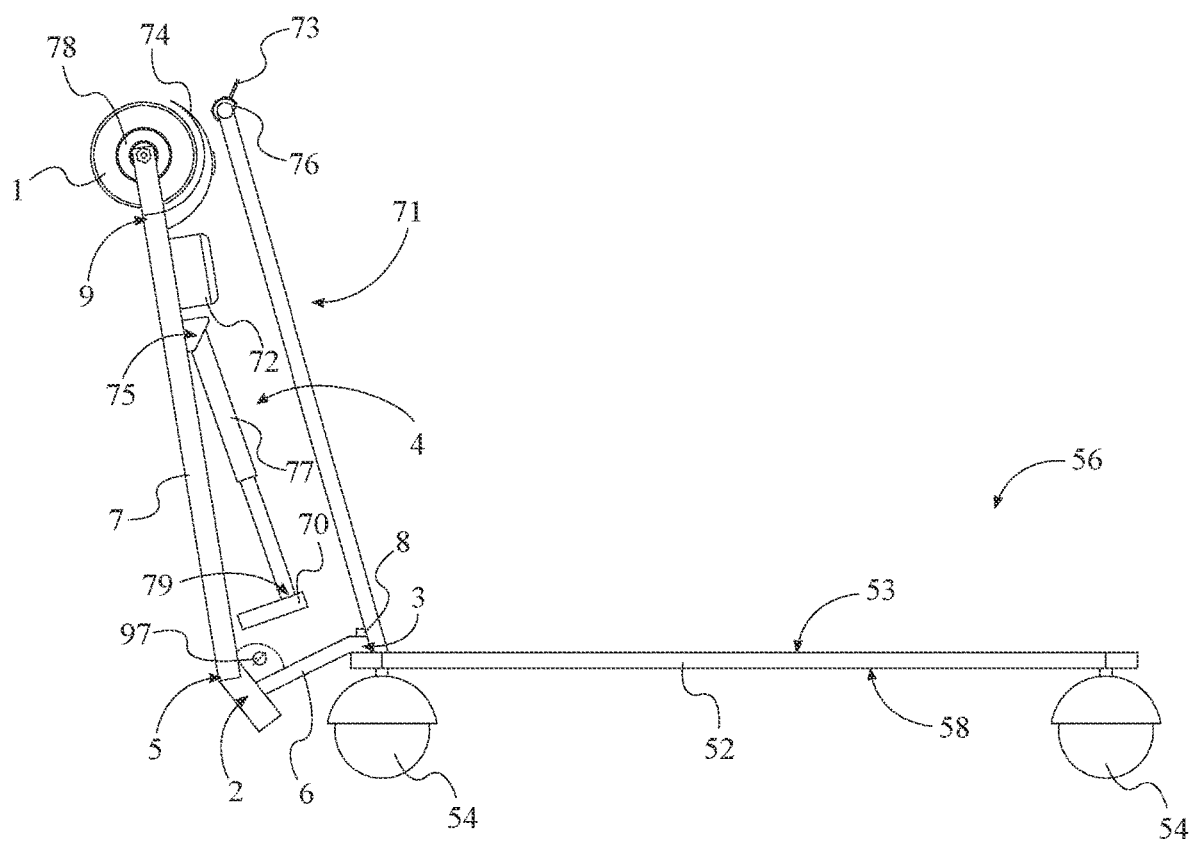
FIG. 4 is a side view showing the present invention, wherein the present invention is shown in a stored configuration.

To facilitate the movement of the scooter deck 1 and the pushcart 25, the present invention provides motorized means to drive the whole assembly. As can be seen in FIGS. 3 and 4, the present invention may further comprise an accelerator control 15 and at least one drive system 16. The at least one drive system 16 provides the rotational forces necessary to rotate the at least one scooter wheel 4. The accelerator control 15 enables the user to manually control the operation of the at least one drive system 16, such as controlling the Revolutions Per Minute (RPM) of the at least one scooter wheel 4. The accelerator control 15 is mounted onto the handlebar assembly 14 so that the accelerator control 15 is easily reached by the user. On the other hand, the at least one drive system 16 is mounted onto the scooter deck 1 so that the at least one drive system 16 is supported by the scooter deck 1. In addition, the at least one drive system 16 is operatively coupled to the at least one scooter wheel 4 so that the at least one drive system 16 is used to selectively accelerate rotation of the at least one scooter wheel 4. For example, the at least one drive system 16 can include a motor rotatably coupled to the at least one scooter wheel 4. The motor is preferably a dual motor with two 1600 watts (W) brushless motors with a maximum speed of 50 miles per hour (MPH). However, the maximum speed may be limited to 30 MPH for safety reasons. Furthermore, the accelerator control 15 is operatively coupled to the at least one drive system 16 so that the accelerator control 15 is used to actuate the at least one drive system 16. For example, the accelerator control 15 can be a throttle accelerator rotatably connected to the handlebar assembly 14 and electrically coupled to the at least one drive system 16. In other embodiments, the accelerator control 15 can be a pedal accelerator hingedly connected to the scooter deck 1 and positioned offset to the at least one seat assembly 9 so that the user can control the acceleration of the at least one scooter wheel 4 using one foot.

To further facilitate the maneuvering and control of the scooter deck 1 and the pushcart 25, the present invention may further comprise a brake control 17 and at least one brake mechanism 18. As can be seen in FIGS. 1 and 2, the brake control 17 enables the user to selectively engage or disengage the at least one brake mechanism 18, and the at least one brake mechanism 18 decelerates the rotation of the at least one scooter wheel 4 accordingly or even bring the at least one scooter wheel 4 to a stop. The brake control 17 is mounted onto the handlebar assembly 14 to enable the user to easily reach and engage the brake control 17. Furthermore, the brake control 17 is operatively coupled to the at least one brake mechanism 18 so that the brake control 17 is used to actuate the at least one brake mechanism 18. For example, the brake control 17 can be a spring-loaded brake lever hingedly connected to the handlebar assembly 14 and positioned adjacent to the accelerator control 15. In addition, the brake control 17 can be connected to the at least one brake mechanism 18 via brake cables to actuate the at least one brake mechanism 18 once the brake control 17 is engaged. Thus, the user can easily accelerate or decelerate the scooter deck 1 and the pushcart 25. In addition, the at least one brake mechanism 18 is operatively integrated into the at least one scooter wheel 4 so that the at least one brake mechanism 18 is used to selectively decelerate rotation of the at least one scooter wheel 4. The at least one brake mechanism 18 can be a caliber brake assembly or a disc brake assembly mounted around the at least one scooter wheel 4. In other embodiments, like the accelerator control 15, the brake control 17 can be a brake pedal hingedly connected to the scooter deck 1 and positioned offset to the at least one seat assembly 9 so that the user can control the deceleration of the at least one scooter wheel 4 using one foot. Further, other mechanical braking mechanisms can be utilized to accommodate multiple scooter wheels.

As previously mentioned, the present invention enables the user to comfortably seat on the scooter deck 1 while riding the present invention. To do so, the at least one seat assembly 9 may comprise a seat 10 and a length-adjustable post 11, as can be seen in FIGS. 1 and 2. The seat 10 comfortably supports the bottom of the user while the length-adjustable post 11 enables the user to adjust the height of the seat 10, thus accommodating the height of the user. The length-adjustable post 11 comprises a first post end 12 and a second post end 13 corresponding to the terminal ends of the tubular design of the length-adjustable post 11. The first post end 12 is positioned opposite to the second post end 13 along the length-adjustable post 11 due to the tubular design of the length-adjustable post 11. The first post end 12 is hingedly connected onto the scooter deck 1 to enable the user to bring the length-adjustable post 11 down when not in use. Further, as can be seen in FIG. 2, the seat 10 is mounted onto the second post end 13, thus positioning the seat 10 offset from the scooter deck 1. In some embodiments, the present invention may accommodate more than one user on the scooter deck 1. To do so, the present invention may comprise multiple seat assemblies distributed along the scooter deck 1 or the at least one seat assembly 9 may comprise a multi-person seat that accommodates multiple users.

Due to the hinge connections of the linkage arm 5 and the length-adjustable post 11, the present invention can be folded away to take less space when the pushcart 25 is placed in storage or when the user wants to use the pushcart 25 without the scooter deck 1. As can be seen in FIG. 3, the scooter deck 1, the at least one seat assembly 9, and the linkage arm 5 are in a deployed configuration. The linkage arm 5 is positioned at an obtuse angle 30 with the scooter deck 1 to keep the scooter deck 1 offset from the pushcart 25 and to keep the scooter deck 1 parallel to the ground. In addition, the length-adjustable post 11 is positioned normal to the scooter deck 1 so that the user can sit straight when seated on the scooter deck 1. Furthermore, the scooter deck 1, the at least one seat assembly 9, and the linkage arm 5 can be repositioned to a stored configuration when not in use or for ease of transportation. As can be seen in FIG. 4, the scooter deck 1, the at least one seat assembly 9, and the linkage arm 5 are in the stored configuration. In the stored configuration, the linkage arm 5 is positioned at an acute angle 31 with the scooter deck 1 to reduce the overall space taken by the linkage arm 5 and the scooter deck 1. In addition, the length-adjustable post 11 is positioned against the scooter deck 1. Thus, the length-adjustable post 11 is sandwiched in between the scooter deck 1 and the linkage arm 5 so that the whole assembly is arranged into a compact structure, enabling the user to easily store away the present invention or if the user wants to use the pushcart 25 without the scooter deck 1.

To increase the functionality of the present invention, various accessories may be additionally provided to help the user comfortably maneuver the scooter deck 1 and the pushcart 25. As can be seen in FIG. 2, the present invention may further comprise a guard fender 19 to protect the rear of the user from backsplash as well as to protect the at least one scooter wheel 4 from rear collisions. The guard fender 19 is mounted adjacent to the second deck end 3 to position the guard fender 19 adjacent to the at least one scooter wheel 4. The guard fender 19 is positioned about the at least one scooter wheel 4 to cover most of the at least one scooter wheel 4. In addition, the guard fender 19 is also positioned offset from the at least one scooter wheel 4 to not obstruct the rotation of the at least one scooter wheel 4. In addition to the guard fender 19, the present invention may further comprise a horn 20. The horn 20 enables the user to alert nearby people of the movement of the scooter deck 1 and the pushcart 25 to prevent accidents. The horn 20 is mounted onto the handlebar assembly 14 so that the user can quickly engage the horn 20 when necessary. In addition, the present invention provides different means to indicate the maneuvering intentions of the user to the surrounding people.

The present invention may further comprise at least one maneuvering indicator 21 and at least one indicator control 22. As can be seen in FIG. 2, the at least one maneuvering indicator 21 may be any type of indicator that lets the user visually or audibly alert other people of the maneuvering intentions of the user. The at least one indicator control 22 enables the user to selectively engage the at least one maneuvering indicator 21. For example, the at least one maneuvering indicator 21 may be a set of signal lights or break lights that enables the user to alert other people when driving through a crowded space. The at least one indicator control 22 may be one or more switches that can be toggled to turn the at least one maneuvering indicator 21 on or off. The at least one maneuvering indicator 21 is mounted offset from the handlebar assembly 14 so that the at least one maneuvering indicator 21 can be placed in a visible location. For example, the at least one maneuvering indicator 21 can be mounted on the front of the pushcart 25 or on the rear of the scooter deck 1. In addition, the at least one indicator control 22 is mounted onto the handlebar assembly 14 so that the user can easily actuate the at least one maneuvering indicator 21. Furthermore, the at least one indicator control 22 is operatively coupled to the at least one maneuvering indicator 21 so that the at one indicator control 22 is used to actuate the at least one maneuvering indicator 21. For example, the at least one indicator control 22 may be communicably coupled to the at least one maneuvering indicator 21 so that the user can remotely control the at least one maneuvering indicator 21. Additional maneuvering accessories can be provided to help the user maneuver in crowded spaces, such as a phone holder, a charging port, an alarm system, a key switch, an odometer, a speedometer, etc.

As previously mentioned, the pushcart 25 is designed to enable the user to transport objects or other people. As can be seen in FIGS. 1 and 2, to support the load of the objects or the people placed on the pushcart 25, the pushcart 25 may comprise a cart platform 26 and a plurality of casters 29. The cart platform 26 is designed to support the load of the objects or the people being transported, while the plurality of casters 29 enable the pushcart 25 to be easily moved in the desired direction. The cart platform 26 is preferably an enlarged flat structure that is big enough to accommodate a desired number of objects or people. Due to the overall flat design of the cart platform 26, the cart platform 26 comprises a first platform face 27 and a second platform face 28. The first platform face 27 and the second platform face 28 are positioned opposite to each other about the cart platform 26. Further, the swivel hitch 8 and the handlebar assembly 14 are peripherally positioned to the cart platform 26 so the translation force from the scooter deck 1 is transmitted to the cart platform 26 without causing undesired rotation of the cart platform 26. The handlebar assembly 14 is mounted onto the first platform face 27 to maintain the handlebar assembly 14 at reach to the user sitting on the at least one seat assembly 9. On the other hand, the plurality of casters 29 is peripherally mounted to the second platform face 28, thus bearing the load of the objects or the people placed on the pushcart 25. In some embodiments, multiple seat assemblies can be mounted onto the cart platform 26 to enable the user to simultaneously transport multiple people. The multiple seat assemblies can be distributed about the cart platform 26 to accommodate as many people as possible. Alternatively, additional seat assemblies can be mounted onto the scooter deck 1 and distributed along the scooter deck 1 so multiple users can ride along on the scooter deck 1.

Figure 5:
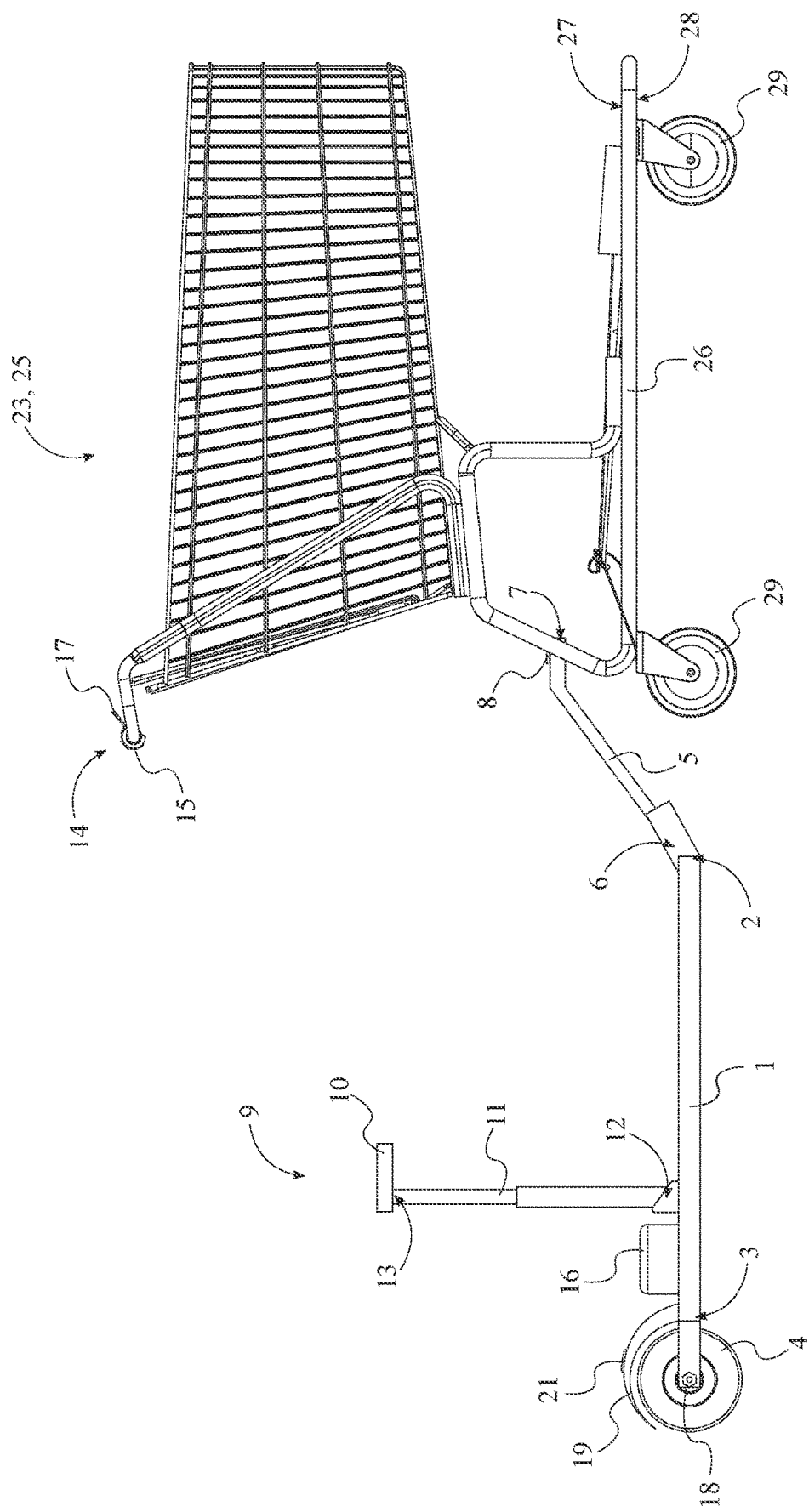
FIG. 5 is a side view showing the present invention, wherein the handlebar assembly and the pushcart are configured into a shopping cart.
Figure 6:
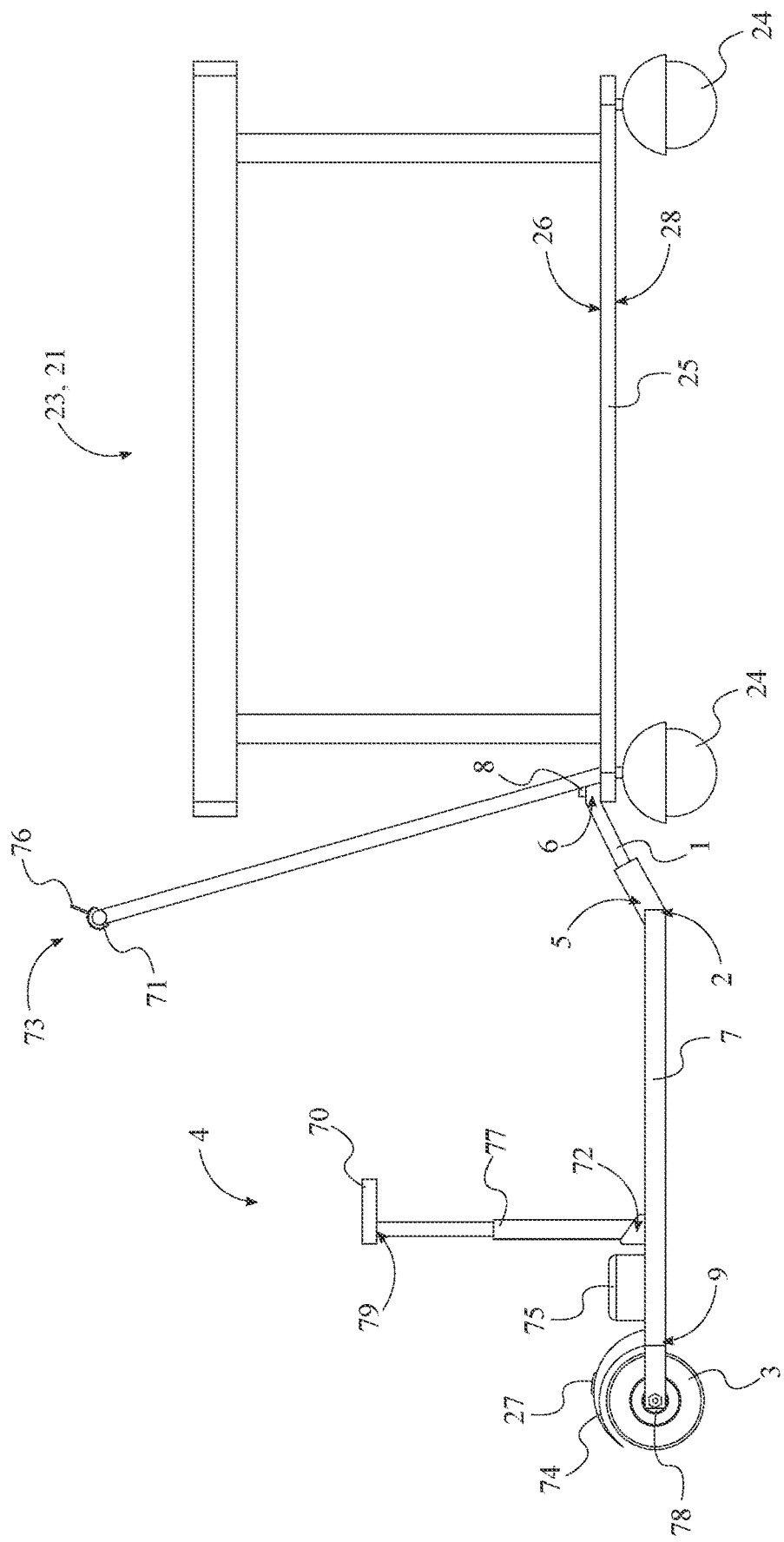
FIG. 6 is a side view showing the present invention, wherein the handlebar assembly and the pushcart are configured into a medical gurney.
Figure 7:
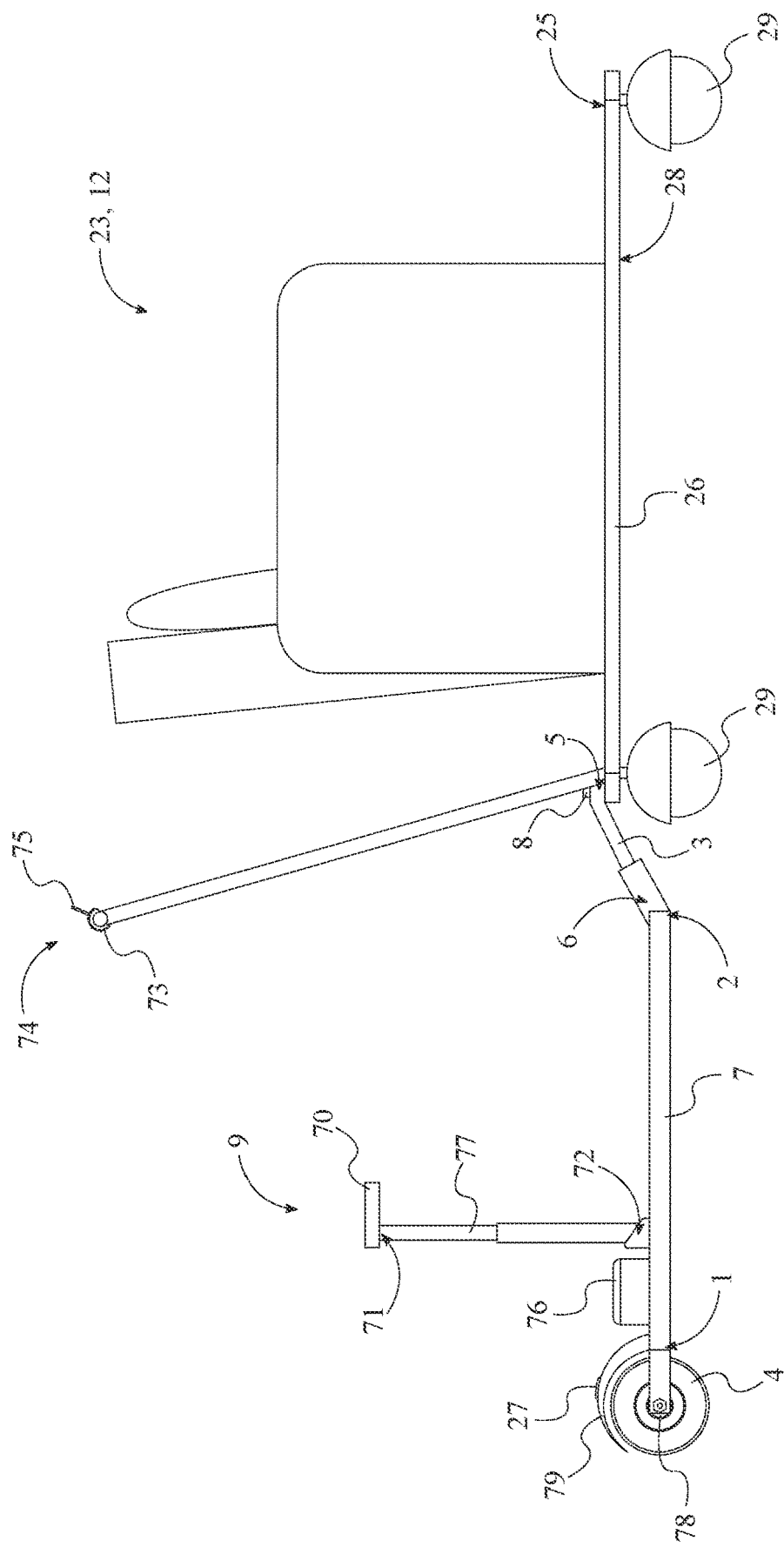
FIG. 7 is a side view showing the present invention, wherein multiple seat assemblies are mounted onto the cart platform.

As previously mentioned, the present invention can be configured into different types of transport devices to accommodate the different needs of users, as can be seen in FIG. 5 through 7. In one embodiment, the handlebar assembly 14 and the pushcart 25 are configured into a shopping cart 23, with a basket mounted onto the cart platform 26 to carry multiple objects, such as groceries, as can be seen in FIG. 5. The elderly and people with disabilities can utilize the present invention to comfortably shop around without having to exert force to drive the shopping cart 23. In addition, multiple items can be placed on the pushcart 25 without requiring the user to exert much force to drive the pushcart 25. In another embodiment, the handlebar assembly 14 and the pushcart 25 are configured into a gurney 24 to enable the user to transport patients, as can be seen in FIG. 6. A bed assembly may be mounted onto the cart platform 26 so that the patient can lie on top of the pushcart 25. In addition, various medical equipment, such as a water supply, a suction supply, and a ventilator can be mounted onto the cart platform 26, under the bed assembly, so that the patient can be given medical aid while being transported on the present invention. Further, as can be seen in FIG. 7, the handlebar assembly 14 and the pushcart are configured into a leisure carriage 32 which may include a seat designed to accommodate two or more people. In other embodiments, the handlebar assembly 14 and the pushcart 25 can be configured into different transport devices so that user can transport other objects or people comfortably.

Although the invention has been explained in relation to its preferred embodiment, it is to be understood that many other possible modifications and variations can be made without departing from the spirit and scope of the invention as hereinafter claimed.

What is claimed is:

1. A motorized scooter cart system comprising:
a scooter deck;
at least one scooter wheel;
a linkage arm;
at least one seat assembly;
a handlebar assembly;
a pushcart;
the scooter deck comprising a first deck end and a second deck end;
the linkage arm comprising a first arm end, a second arm end, and a swivel hitch;
the first deck end being positioned opposite to the second deck end across the scooter deck;
the first arm end being positioned opposite to the second arm end along the linkage arm;
the first arm end being hingedly connected to the first deck end;
the second arm end being attached onto the pushcart by the swivel hitch;
the at least one scooter wheel being rotatably mounted to the second deck end;
the at least one seat assembly being mounted onto the scooter deck;
the at least one seat assembly being positioned adjacent to the scooter second end;
the handlebar assembly being mounted onto the pushcart, adjacent to the linkage arm;
the at least one seat assembly comprising a seat and a length-adjustable post;
the length-adjustable post comprising a first post end and a second post end;
the first post end being positioned opposite to the second post end along the length-adjustable post;
the first post end being hingedly connected onto the scooter deck;
the seat being mounted onto the second post end;
wherein when the scooter deck, the at least one seat assembly, and the linkage arm are in a stored configuration,
the linkage arm is positioned at an acute angle with the scooter deck, and,
the length-adjustable post is positioned against the scooter deck.

2. The motorized scooter cart system as claimed in claim 1 comprising:
an accelerator control;
at least one drive system;
the accelerator control being mounted onto the handlebar assembly;
the at least one drive system being mounted onto the scooter deck;
the at least one drive system being operatively coupled to the at least one scooter wheel, wherein the at least one drive system is used to selectively accelerate rotation of the at least one scooter wheel; and,
the accelerator control being operatively coupled to the at least one drive system, wherein the accelerator control is used to actuate the at least one drive system.

3. The motorized scooter cart system as claimed in claim 1 comprising:
a brake control;
at least one brake mechanism;
the brake control being mounted onto the handlebar assembly;
the at least one brake mechanism being operatively integrated into the at least one scooter wheel, wherein the at least one brake mechanism is used to selectively decelerate rotation of the at least one scooter wheel; and,
the brake control being operatively coupled to the at least one brake mechanism, wherein the brake control is used to actuate the at least one brake mechanism.

4. The motorized scooter cart system as claimed in claim 1 comprising:
wherein when the scooter deck, the at least one seat assembly, and the linkage arm are in a deployed configuration,
the linkage arm is positioned at an obtuse angle with the scooter deck, and,
the length-adjustable post is positioned normal to the scooter deck.

5. The motorized scooter cart system as claimed in claim 1 comprising:
a guard fender;
the guard fender being mounted adjacent to the second scooter end;
the guard fender being positioned about the at least one scooter wheel; and,
the guard fender being positioned offset from the at least one scooter wheel.

6. The motorized scooter cart system as claimed in claim 1 comprising:
a horn; and,
the horn being mounted onto the handlebar assembly.

7. The motorized scooter cart system as claimed in claim 1 comprising:
at least one maneuvering indicator;
at least one indicator control;
the at least one maneuvering indicator being mounted offset from the handlebar assembly;
the at least one maneuvering control being mounted onto the handlebar assembly; and,
the at least one indicator control being operatively coupled to the at least one maneuvering indicator, wherein the at least one indicator control is used to actuate the at least one maneuvering indicator.

8. The motorized scooter cart system as claimed in claim 1 comprising:
the pushcart comprises a cart platform and a plurality of casters;
the cart platform comprises a first platform face and a second platform face;
the first platform face and the second platform face being positioned opposite to each other about the cart platform;
the swivel hitch and the handlebar assembly being peripherally positioned to the cart platform;
the handlebar assembly being mounted onto the first platform face; and,
the plurality of casters being peripherally mounted to the second platform face.

9. The motorized scooter cart system as claimed in claim 1, wherein the handlebar assembly and the pushcart are configured into a shopping cart.

10. The motorized scooter cart system as claimed in claim 1, wherein the handlebar assembly and the pushcart are configured into a gurney.

11. A motorized scooter cart system comprising:
a scooter deck;

at least one scooter wheel;
a linkage arm;
at least one seat assembly;
a handlebar assembly;
a pushcart;
the scooter deck comprising a first deck end and a second deck end;
the linkage arm comprising a first arm end, a second arm end, and a swivel hitch;
the at least one seat assembly comprising a seat and a length-adjustable post;
the length-adjustable post comprising a first post end and a second post end;
the first deck end being positioned opposite to the second deck end across the scooter deck;
the first arm end being positioned opposite to the second arm end along the linkage arm;
the first arm end being hingedly connected to the first deck end;
the second arm end being attached onto the pushcart by the swivel hitch;
the at least one scooter wheel being rotatably mounted to the second deck end;
the at least one seat assembly being mounted onto the scooter deck;
the at least one seat assembly being positioned adjacent to the scooter second end;
the handlebar assembly being mounted onto the pushcart, adjacent to the linkage arm;
the first post end being positioned opposite to the second post end along the length-adjustable post;
the first post end being hingedly connected onto the scooter deck;
the seat being mounted onto the second post end;
wherein the scooter deck, the at least one seat assembly, and the linkage arm are in a stored configuration;
the linkage arm being positioned at an acute angle with the scooter deck; and,
the length-adjustable post being positioned against the scooter deck;
an accelerator control;
at least one drive system;
a brake control;
at least one brake mechanism;
the accelerator control being mounted onto the handlebar assembly;
the at least one drive system being mounted onto the scooter deck;
the brake control being mounted onto the handlebar assembly;
the at least one drive system being operatively coupled to the at least one scooter wheel, wherein the at least one drive system is used to selectively accelerate rotation of the at least one scooter wheel;
the accelerator control being operatively coupled to the at least one drive system, wherein the accelerator control is used to actuate the at least one drive system;
the at least one brake mechanism being operatively integrated into the at least one scooter wheel, wherein the at least one brake mechanism is used to selectively decelerate rotation of the at least one scooter wheel; and,
the brake control being operatively coupled to the at least one brake mechanism, wherein the brake control is used to actuate the at least one brake mechanism.

12. The motorized scooter cart system as claimed in claim 11 comprising:
wherein when the scooter deck, the at least one seat assembly, and the linkage arm are in a deployed configuration,
the linkage arm is positioned at an obtuse angle with the scooter deck, and,
the length-adjustable post is positioned normal to the scooter deck.

13. The motorized scooter cart system as claimed in claim 11 comprising:
a guard fender;
a horn;
at least one maneuvering indicator;
at least one indicator control;
the guard fender being mounted adjacent to the second scooter end;
the guard fender being positioned about the at least one scooter wheel;
the guard fender being positioned offset from the at least one scooter wheel;
the horn being mounted onto the handlebar assembly;
the at least one maneuvering indicator being mounted offset from the handlebar assembly;
the at least one maneuvering control being mounted onto the handlebar assembly; and,
the at least one indicator control being operatively coupled to the at least one maneuvering indicator, wherein the at least one indicator control is used to actuate the at least one maneuvering indicator.

14. The motorized scooter cart system as claimed in claim 11 comprising:
the pushcart comprises a cart platform and a plurality of casters;
the cart platform comprises a first platform face and a second platform face;
the first platform face and the second platform face being positioned opposite to each other about the cart platform;
the swivel hitch and the handlebar assembly being peripherally positioned to the cart platform;
the handlebar assembly being mounted onto the first platform face; and,
the plurality of casters being peripherally mounted to the second platform face.

15. The motorized scooter cart system as claimed in claim 11, wherein the handlebar assembly and the pushcart are configured into a shopping cart.

16. The motorized scooter cart system as claimed in claim 11, wherein the handlebar assembly and the pushcart are configured into a gurney.

* * * * *